United States Patent
Wichert

[15] 3,646,385
[45] Feb. 29, 1972

[54] MOTOR VEHICLE HEADLIGHT AND DOUBLE-FILAMENT INCANDESCENT LAMP THEREFOR WITH GLARE LIGHT SHIELD

[72] Inventor: Gerhard Wichert, Munich, Germany
[73] Assignee: Patent-Treuhand-Gesellschaft fur elektrische Gluhlampen mbH
[22] Filed: Jan. 5, 1970
[21] Appl. No.: 567

[30] Foreign Application Priority Data
Jan. 10, 1969 Germany ..................P 19 01 179.1

[52] U.S. Cl. ..........................313/115, 313/114, 313/117, 313/273
[51] Int. Cl. ..........................................H01k 1/26
[58] Field of Search.................313/110, 111, 112, 113, 114, 313/115

[56] References Cited

UNITED STATES PATENTS

| | | | |
|---|---|---|---|
| 3,317,772 | 5/1967 | Lindae | 313/113 |
| 2,858,467 | 10/1958 | Meese et al. | 313/115 |
| 2,879,425 | 3/1959 | Darsie | 313/115 |
| 3,445,713 | 5/1969 | Cardwell | 313/273 |
| 3,493,806 | 2/1970 | Jacobs et al. | 313/113 |

Primary Examiner—Herman Karl Saalbach
Assistant Examiner—C. Baraff
Attorney—James J. Lazna, Henry P. Truesdell, Frank L. Neuhauser, Oscar B. Waddell and Joseph B. Forman

[57] ABSTRACT

An incandescent motor vehicle headlight lamp having a pair of linear coiled filaments disposed in spaced tandem relation is provided with a scoop-shaped light-intercepting shield underlying the forward filament and having a rearward extension masking off the space between the two filaments as well as the region overlying the rearward filament back to the focal plane of the reflector.

8 Claims, 8 Drawing Figures

PATENTED FEB 29 1972 3,646,385
SHEET 1 OF 2
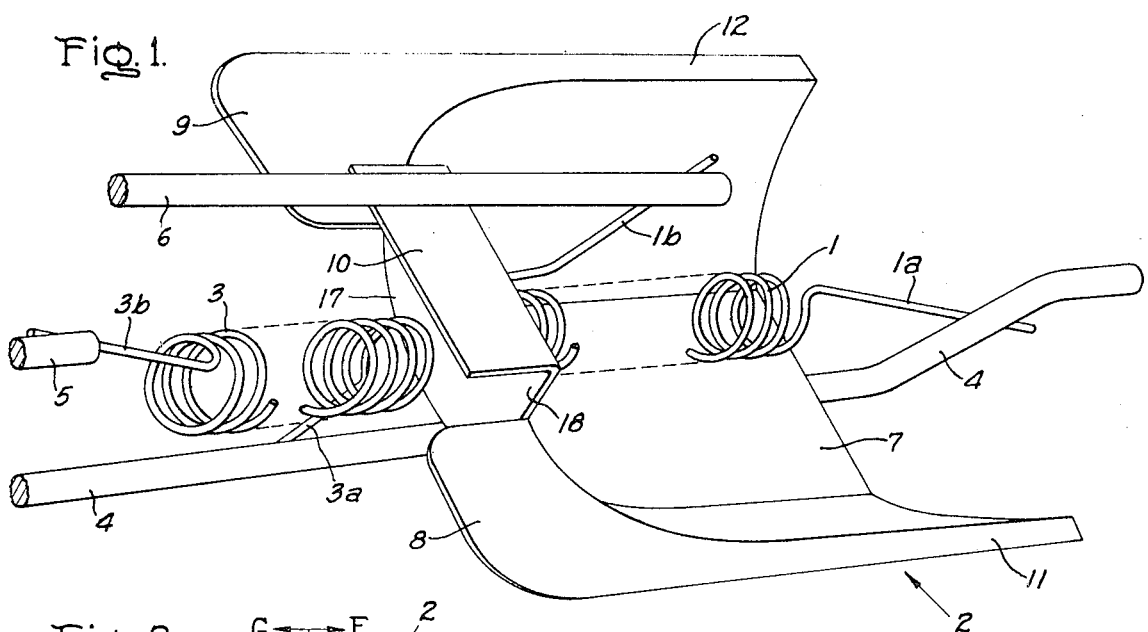
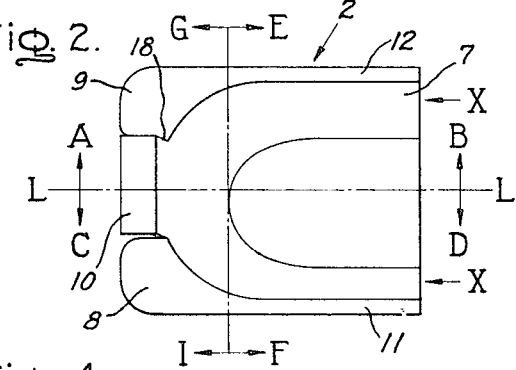
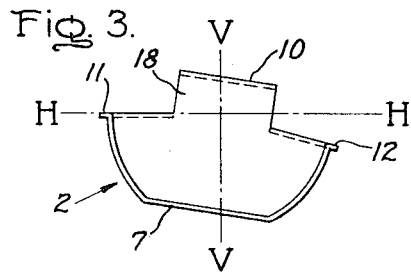
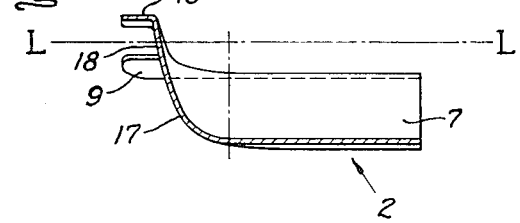
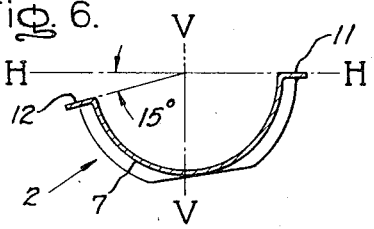
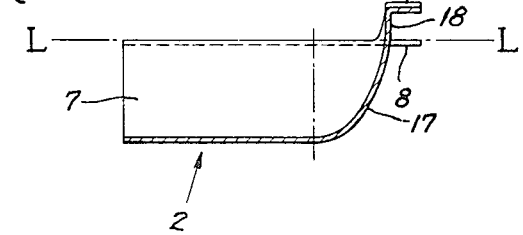
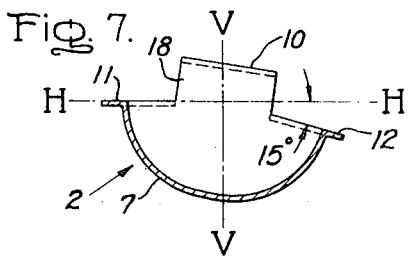
Inventor:
Gerhard Wichert
by James J. Layne
His Attorney

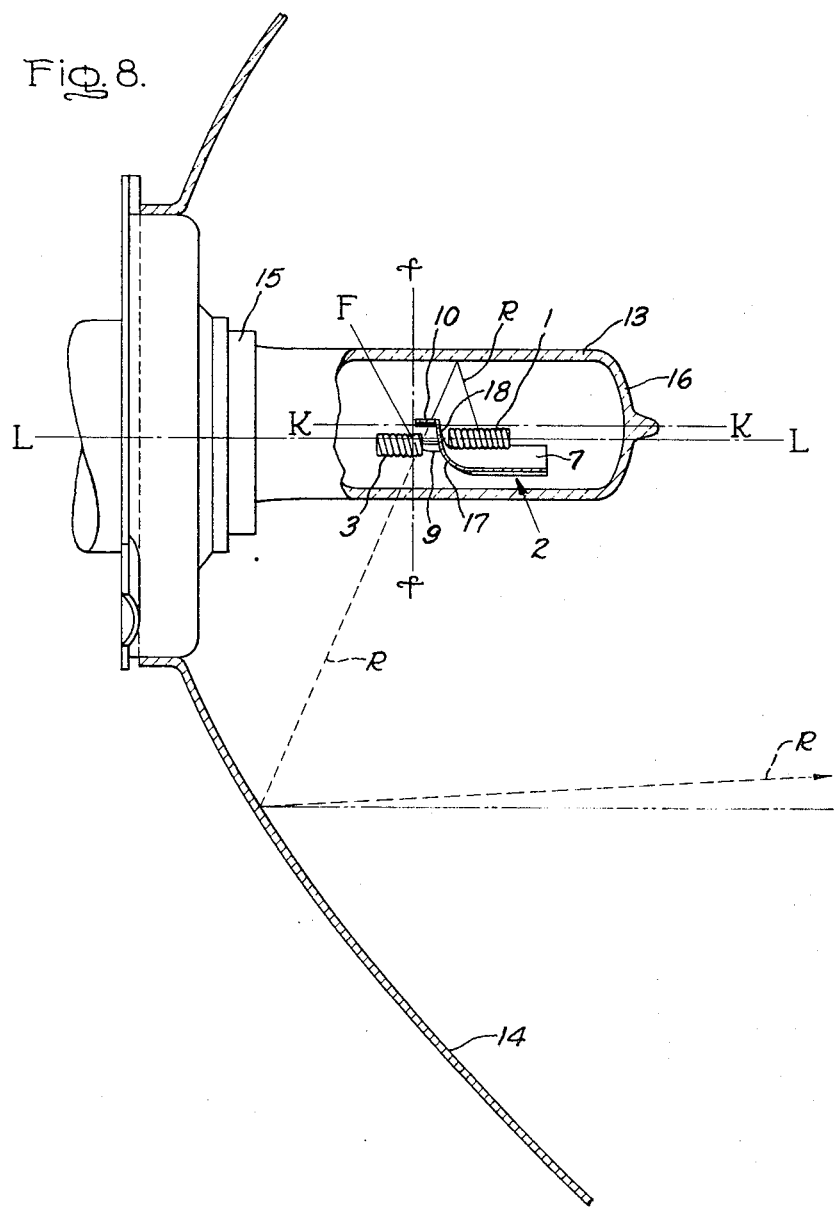

MOTOR VEHICLE HEADLIGHT AND DOUBLE-FILAMENT INCANDESCENT LAMP THEREFOR WITH GLARE LIGHT SHIELD

BACKGROUND OF THE INVENTION

1. Field of the Invention

This invention relates, in general, to motor vehicle headlights and to double-filament incandescent lamps therefor, especially those of the well-known halogen cycle type. More particularly, the invention relates to a glare light shield for such headlight lamps.

2. Description of the Prior Art

As is well known, double-filament incandescent lamps for motor vehicle headlights such as are in general use at present, particularly on the European Continent, comprise a pair of linear coiled filaments disposed in tandem arrangement in the lamp envelope. The low-beam filament intended for generation of the depressed passing beam is disposed, in the case of lamps mounted in the headlight reflector, in front of the reflector focus and approximately in the axis of the headlight reflector, whereas the upper beam filament intended for generation of the driving or high beam is disposed adjacent the focus, i.e., between the focus and the apex of the reflector, so that the distance of the light center of the upper beam filament from the focal plane passing through the reflector focus and at right angles to the reflector axis is as small as possible. For defining the depressed passing beam, a shield is customarily provided in the incandescent lamp for shielding or masking off those direct light rays from the forward or low-beam filament which are directed in a downward direction and which would otherwise strike the lower half of the headlight reflector and be reflected thereby into an upward path through the headlight lens. Thus, only those light rays from the forward or low-beam filament which are directed into the upper hemisphere therefrom are incident on the headlight reflector where they are then reflected through the headlight lens to produce a depressed passing beam with a light-dark boundary.

The asymmetrical light distribution of the depressed passing beam of motor vehicle headlights which is now standard practice is attained in headlights such as those commonly in use on the European Continent by specially shaped light-intercepting shields incorporated in the incandescent lamp. The conventional type shields employed for such purpose generally have been so constructed as not to completely shield or mask off all the downwardly directed radiation from the low-beam filament but instead leave unobstructed those downward radiations within an angular region of about 15° downward from the horizontal plane and to the right or left of the reflector axis (depending on the type of traffic), as disclosed in German Pat. No. 753,358. The light rays from the passing beam filament which pass through this unobstructed angular region are then reflected by the headlight reflector outwardly from the headlight in a slightly upward direction and, correspondingly to one side or the other of the headlight so as to illuminate objects at the side of the road at some distance ahead.

Following the introduction into use of well-known halogen cycle type incandescent lamps for motor vehicle headlights, it was proposed to also apply the principle of the halogen cycle lamp to the conventional double-filament-type incandescent lamps commonly employed in motor vehicle headlights (El. Rev. 179, 8, 290. 1966). Initially, locally shielding opaque coatings were applied to the outer surface of the cylindrical lamp envelope of such double-filament halogen cycle-type incandescent lamps for the purpose of establishing the light-dark boundary of the passing beam. Coatings of this type, however, operated to simultaneously reduce the light flux of the driving beam considerably. Subsequently, the principle heretofore applied to double-filament incandescent lamps to establish the light-dark boundary in the passing beam by means of a shield, was also applied to such double-filament halogen cycle-type incandescent lamps (Hungarian Pat. application EE-1419). The lamps with such an internal shield, however, displayed brightenings or glare light above the light-dark boundary of the passing beam, these brightenings leading to considerable dazzling of the oncoming traffic. It was found that this glare light resulted most of all from those rays from the low-beam filament which are reflected by the cylindrical envelope of the lamp.

SUMMARY OF THE INVENTION

It is an object of the invention, therefore, to provide a double-filament electric incandescent lamp of the above-mentioned type, for use as the light source in motor vehicle headlights, which will substantially eliminate the upward glare light heretofore resulting from reflection of certain of the light rays emitted by the low-beam filament.

Another object of the invention is to provide such a double-filament electric incandescent lamp which is of the halogen cycle type.

Still another object of the invention is to provide a motor vehicle headlight having a novel form of double-filament electric incandescent lamp as its light source and which is substantially free of upward glare light from those light rays emitted by the low-beam filament of the lamp which are reflected off the lamp envelope.

Briefly stated, in accordance with one aspect of the invention, an electric incandescent motor vehicle headlight lamp having a pair of linear coiled filaments mounted in tandem relation within a cylindrical or tubular envelope and a bonnet or scoop-shaped light-intercepting shield disposed beneath the forward or low-beam filament, for selective generation by the headlight of either a high-driving beam or a depressed passing beam with a sharp light-dark boundary and with asymmetrical light distribution, is characterized in that the shield is provided at its base end with additional shielding means extending between the two filaments and covering or masking off the space between the base end of the shield proper and the focal plane of the headlight reflector at least in its central region within and to either side of the vertical axial plane of the reflector. Preferably, in accordance with a further aspect of the invention, three such additional shielding means are provided, i.e., a central shield extension and lateral wing extensions located at each side thereof, which altogether cover or mask off the space between the base end of the scoop-shaped body portion of the shield and the focal plane of the headlight reflector, the lateral or side wing extensions being located immediately adjacent and extending laterally from the rim of the main body portion of the shield at its base end whereas the central shield extension is upwardly displaced therefrom so as to be spaced above the rearward or driving beam filament which is mounted approximately at the focus of the headlight reflector.

Further objects and advantages of the invention will appear from the following detailed description thereof and from the accompanying drawing.

BRIEF DESCRIPTION OF THE DRAWING

In the drawing,

FIG. 1 is a perspective view on an enlarged scale of the internal mount and shield structure of a double-filament electric incandescent lamp according to the invention;

FIG. 2 is a top plan view, on an enlarged scale, of the light-intercepting shield in the lamp;

FIG. 3 is an end view of the shield, as viewed in the direction of the arrows X—X in FIG. 2;

FIGS. 4 to 7 are sectional views, on an enlarged scale, of the shield taken on the lines A–B, C–D, E–F and G–I, respectively, of FIG. 2; and FIG. 8 is a fragmentary sectional view, on an enlarged scale, through the vertical axial plane of a vehicle headlight provided with an electric incandescent lamp according to the invention shown partly in elevation and partly broken away in section.

DESCRIPTION OF THE PREFERRED EMBODIMENT

Referring to FIG. 1 showing the internal mount structure of an electric incandescent lamp according to the invention for use in motor vehicle headlights for right hand traffic, the mount structure there illustrated comprises a pair of helically coiled linear filaments 1 and 3 disposed in spaced tandem relation longitudinally within a cylindrical or tubular sealed envelope 13 (FIG. 8) of suitable vitreous material. The lamp preferably is of the well-known halogen cycle type such as disclosed, for example, in U.S. Pat. No. 2,883,571 to Fridrich et al., and employing tungsten wire filaments 1, 3 within an envelope 13 composed of essentially fused silica, i.e., quartz or a hard glass of high-melting point and low expansion and containing a filling of an inert gas and a small quantity of a halogen such as bromine or iodine which serves as a regenerative getter, in the manner now well known. The forward or low-beam filament 1 is positioned axially of the reflector axis L—L and within a light-intercepting shield 2 of bonnet or scoop shape, i.e., an oblong shallow dish open toward one end and having an out-turned rim forming the lateral side wings 11 and 12. The rearward or upper beam filament 3 is disposed between the shield 2 and the base end 15 of the lamp mounted at the apex of the headlight reflector 14, and it is positioned adjacent the reflector focus F with its coil axis parallel to and offset slightly downwardly from the reflector axis L—L. Support wires 4, 5 and 6 serving as current inleads for the filaments 1 and 3 extend into the envelope 13 from its base end. Filament 1 is electrically connected to and supported in place by the wire inleads 4 and 6 to which the end legs 1a and 1b of the filament 1 are respectively secured. Filament 3 is electrically connected to and supported in place by the wire inleads 4 and 5 to which the end legs 3a and 3b of the filament 3 are respectively secured.

The shield 2 comprises a main scoop-shaped body portion or shield proper 7 disposed longitudinally of and along one side of the forward or low-beam filament 1 in a forwardly facing position with its open end toward the dome end 16 of the lamp envelope 13, and with its dished side facing toward filament 1 and more or less laterally centered with respect thereto and its closed or base end 17 located adjacent the space between the two filaments 1 and 3. The shield 2 is formed with three additional shield portions in the form of outward extensions 8, 9 and 10 which extend from the rim of the shield proper 7 at its closed base end 17. The rearwardly extending wing portions 8 and 9 are formed as continuations of the side wing portions 11 and 12 of the shield proper 7, and they are disposed in planes which pass through and include the longitudinal center axis of the shield proper 7 which, as shown, is coincident with the headlight reflector axis L—L. As shown more particularly in FIGS. 6 and 7, and in accordance with established practice, the portions of the rim of the shield proper 7 on opposite sides of its longitudinal axis L, along with the respective out-turned side and rearward wing portions 11, 12 and 8, 9, lie in axial planes of the low-beam filament 1 forming an included angle therebetween a few degrees, e.g., around 15° or so, less than 180°. In the case of the particular lamp shown designed for right-hand traffic, the lamp is then positioned in the headlight reflector 14 in the customary manner with the right-side wing portion 11 of the shield 2 (as viewed from the base end 15 of the lamp) disposed in the horizontal plane H—H of the reflector 14 and with the left-side wing portion 12 angled downwardly from the horizontal plane H—H at the above-mentioned small angle of around 15° or thereabouts. Where the lamp is to be used for left-hand traffic, the lamp in such case is positioned in the reflector 14 with its shield 2 tilted in the opposite direction from that shown in the drawings so that its right-side wing portion 11 is angled downwardly at the aforementioned small angle of 15° or so. Those downward light rays from the low-beam filament 1 which are thus permitted to pass through the unobstructed 15° or so angular region below the horizontal H—H, at one or the other side of the vertical plane V—V, are then reflected by the headlight reflector 14 outwardly and slightly upwardly from the headlight, and respectively to the opposite side of the vertical plane V—V of the headlight, so as to illuminate objects at the side of the road adjacent the vehicle and at some distance ahead.

FIGS. 2 through 7 illustrate the arrangement of the shield 2 within the reference system of the lamp which is identical with the reference system of the headlight reflector 14. In FIG. 2, the shield 2 is shown upon projection onto the horizontal plane H—H of the reflector 14. The vertical plane V—V, and the horizontal plane H—H both traverse the axis L—L of the headlamp reflector 14, thus constituting axial planes thereof. As shown in FIG. 8, a double-filament incandescent lamp according to the invention and comprising the cylindrical or tubular envelope 13 of vitreous material containing the novel light-intercepting shield 2 comprising the invention is disposed in the headlight reflector 14 with its tubular envelope 13 extending parallel to and positioned with its axis K—K slightly above the reflector axis L—L and with the coil axis of its low-beam filament 1 disposed approximately coincident with the reflector axis L—L.

The additional shield portions 8, 9 and 10 extending rearwardly from the rim of the shield proper 7 at its base end 17 serve to intercept and mask off those light rays from the low-beam filament 1 which, after reflection from the upper half of the tubular lamp envelope 13, would otherwise be reflected back down onto the lower half of the reflector 14 and lead to undesired glare light from the headlamp. As mentioned above, the rearwardly extending lateral wing portions 8 and 9 of the shield 2 extend from the rim of the shield proper 7 and thus lie immediately thereadjacent. The central shield or wing portion 10, however, is upwardly displaced from the rim of the shield proper 7 so as to be located above the rearward or driving beam filament 3. To this end, the central wing portion 10 is formed by a rearwardly bent free-end portion of a flange 18 which extends upwardly from the rim of the shield proper 7 at its base end 17 and between the two spaced filaments 1 and 3. As shown, the upwardly displaced wing portion 10 of the shield extends back to the focal plane $f$—$f$ of the reflector 14 and overlies the forward end of the rearward or driving beam filament 3. The splitting-up of the base end shielding into three separate sectional areas provided by the shield wing portions 8, 9 and 10 permits the disposal of the upper or driving beam filament 3 in the conventional manner, i.e., with its coil axis approximately coincident with or, as shown, offset slightly downward from the reflector axis L—L and with at least its forward end located in the focus F of the reflector 14.

Some of the light rays from the upper beam filament 3 directed towards the upper hemisphere of the reflector 14 are shielded by the central shielding wing portion 10 of the shield 2. However, the light flux collected by the upper hemisphere of the reflector contributes much less to the range of transmission and to the lateral diffusion width of the driving beam than the light flux collected by the lower hemisphere of the reflector, inasmuch as the upper half of the light distributing lens (not shown) of the headlight is preferably designed to the requirements of the passing beam, in accordance with conventional practice. The light rays from the upper beam filament 3 directed towards the lower hemisphere of the reflector are not intercepted and masked off in any way by the shield 2.

The wing portions 8, 9 and 10 of the shield 2 intercept and mask off those light rays emerging from the low-beam filament 1 which impinge on the lamp envelope 13 either directly from the filament 1, or after reflection by the inner surface of the shield proper 7, and are there reflected downwardly and rearwardly. As is to be seen from the path R of these light rays in FIG. 8, they would lead to glare light if they penetrate through the horizontal axial plane H—H of the reflector 14 at points between the shield proper 7 and the focal plane $f$—$f$ of the reflector 14. For this reason, the areas shielded by the wing portions 8, 9 and 10 of the shield 2 must, at least in the central region thereof adjacent the vertical axial plane V—V of the reflector 14, extend rearwardly from the shield proper 7 approximately up to the focal plane $f-f$ of the reflector. The vertical wall or flange 18 which extends upwardly from the rim of the shield proper 7 between the two filaments 1 and 3 and has its free end bent over and backwardly to form the lateral shielding portion 10, serves to intercept and mask off those light rays emitted by the forward or passing beam filament 1 which would otherwise impinge on and be reflected by the rearward or upper beam filament 3 to cause glare. The lateral wing portions 8 and 9 of the shield 2 are additionally adapted to prevent glare by rays which, after their emergence from the low-beam filament 1, would otherwise impinge on portions in the lower hemisphere of the headlight reflector 14 adjacent the base-end aperture of the headlight.

Numerous modifications of the embodiment of the shield 2 are possible without departing from the basic idea of the invention. Thus, the main body portion 7 of the shield 2 may be bonnet-shaped as illustrated, or trough-shaped. Of course, the inventive idea is also applicable to double-filament halogen cycle-type incandescent lamps for driving beam and modified passing beam light distributions, more particularly, for driving beam and symmetrical passing beam light distribution.

Because of the high temperature and the halogen cycle present within a lamp according to the invention of the halogen cycle-type, molybdenum preferably may be used as the material for the shield 2. Thus, the novel shield 2 according to the invention may be made, for example, from molybdenum foil of approximately 0.2 mm. thickness by a deep-drawing and stamping process. The novel shield 2 illustrated in detail in various views in FIGS. 2 through 7 has an overall length of about 11 mm. and an overall width of about 8 mm. It is designed for a double-filament halogen cycle-type incandescent lamp for use in motor vehicle headlights for projecting both a driving beam and a passing beam. With a rated voltage of 12 volts, the filaments have a wattage of about 60 or 55 watts.

What I claim as new and desire to secure by Letters Patent of the United States is:

1. A double-filament incandescent lamp for motor vehicle headlights, said lamp comprising a tubular envelope of vitreous material adapted to be mounted in the headlight reflector generally axially thereof, a pair of linear coil filaments disposed in said envelope in spaced tandem relation longitudinally thereof to extend approximately axially of the reflector in the mounted position of the lamp therein with the rearward filament positioned adjacent the reflector focus, and a light-intercepting shield in said envelope comprising a scoop-shaped body portion disposed longitudinally of and along one side of the forward one of said filaments in a forwardly facing position with its dished side facing toward said forward filament and its closed base end located adjacent the space between the said filaments, said shield being provided with a flange portion extending from the rim of its closed base end through the space between the said filaments and terminating in a wing portion extending rearwardly to the focal plane of the reflector along that side of the rearward filament opposite from the shield body portion.

2. A double-filament incandescent lamp as specified in claim 1 wherein the said shield is additionally provided with lateral wing portions extending rearwardly from the rim of its closed base end, at each side of the said flange portion, to the said reflector focal plane.

3. A double-filament incandescent lamp as specified in claim 1 wherein the said filaments are constituted of tungsten wire and wherein the said envelope consists of essentially fused silica and contains a filling of an inert gas and a small quantity of a halogen-containing gas serving as a regenerative getter.

4. A double-filament incandescent lamp as specified in claim 2 wherein the said filaments are constituted of tungsten wire and wherein the said envelope consists of essentially fused silica and contains a filling of an inert gas and a small quantity of a halogen-containing gas serving as a regenerative getter.

5. A vehicle headlamp comprising a concave reflector, and a double-filament incandescent lamp comprising a tubular envelope of vitreous material mounted in said reflector generally axially thereof, said lamp having a pair of linear coil filaments disposed in said envelope in spaced tandem relation and extending approximately axially of the reflector with the rearward filament positioned adjacent the reflector focus, and a light-intercepting shield in said envelope comprising a scoop-shaped body portion disposed below and longitudinally of the forward filament in a forwardly facing position with its dished side facing toward said forward filament and its closed base end located adjacent the space between the said filaments, said shield being provided with a flange portion extending from the rim of its closed base end upwardly through the space between the said filaments and terminating in a generally horizontally disposed wing portion extending rearwardly over the rearward filament to the focal plane of the reflector.

6. A vehicle headlamp as specified in claim 5 wherein the said shield is additionally provided with lateral wing portions extending rearwardly from the rim of its closed base end, at each side of the said flange portion, to the said reflector focal plane.

7. A vehicle headlamp as specified in claim 5 wherein the said filaments are constituted of tungsten wire and wherein the said envelope consists of essentially fused silica and contains a filling of an inert gas and a small quantity of a halogen-containing gas serving as a regenerative getter.

8. A vehicle headlamp as specified in claim 6 wherein the said filaments are constituted of tungsten wire and wherein the said envelope consists of essentially fused silica and contains a filling of an inert gas and a small quantity of a halogen-containing gas serving as a getter.

* * * * *